J. B. SUITT.
Thrashing-Machines.
No. 142,961.   Patented September 16, 1873.
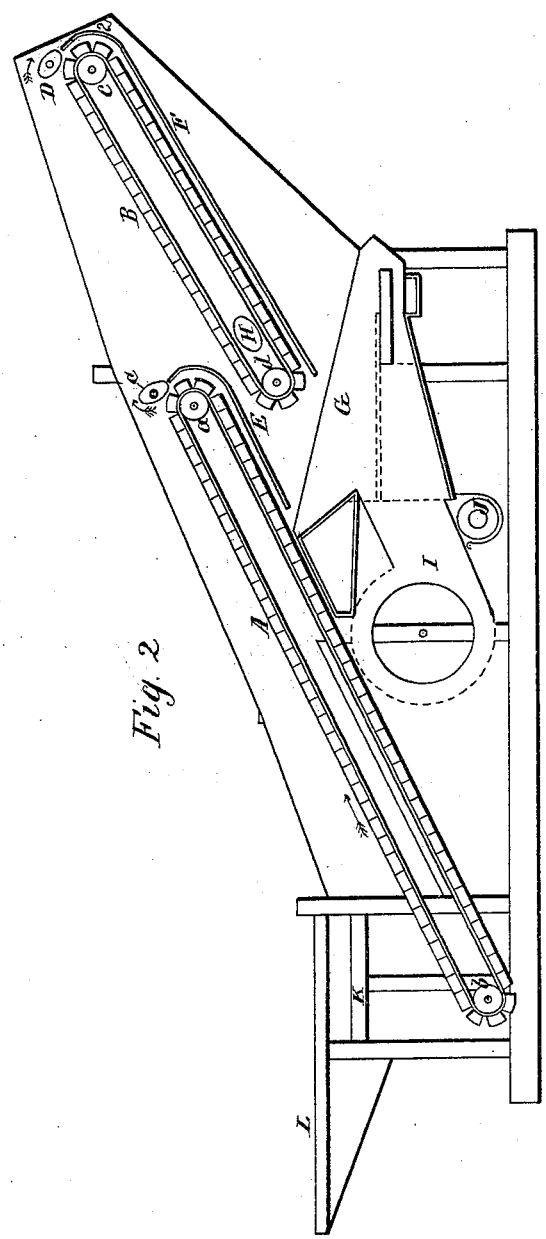
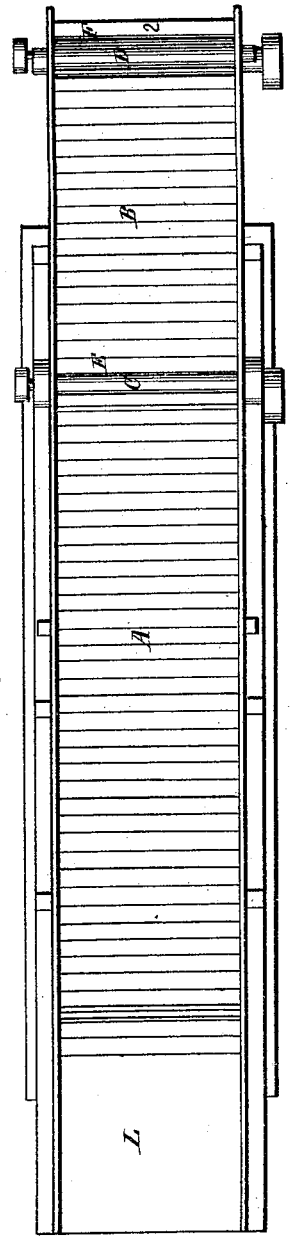
Witnesses
J. G. Lightford
Wm Sullivan
Inventor
James B. Suitt

UNITED STATES PATENT OFFICE.

JAMES B. SUITT, OF INDIANAPOLIS, INDIANA.

IMPROVEMENT IN THRASHING-MACHINES.

Specification forming part of Letters Patent No. 142,961, dated September 16, 1873; application filed September 23, 1872.

*To all whom it may concern:*

Be it known that I, JAMES B. SUITT, of Indianapolis, in the county of Marion and State of Indiana, have invented a new and useful Improvement in Grain-Thrashers; and I do hereby declare that the following is a full, clear, and exact description of the construction and operation of the same, reference being had to the annexed drawings making part of this specification, and to the letters and figures of reference marked thereon.

Figure 1 of the drawings is a representation of a plan or top view of my improvement in grain-thrashers. Fig. 2 is a vertical longitudinal section of the same.

The nature of my invention consists in combining with the second apron a flipper for raising the straw upward and carrying it over the end of the belt, and a shoe for catching the grain which is carried along with the straw, the upturned end of which extends upward to, or slightly above, the top of the belt, as will be more fully described hereafter.

A represents an endless belt passing over and around the rollers $a$ $b$ in the usual manner. At the upper end of this apron is placed a flipper, C, which catches under the straw as it is carried forward by the apron, and lifts it over onto the second apron B. Extending along under, and up the upper end of the belt A, is the shoe E, which catches the wheat or other grain which passes over the end of the belt, and conveys it to the sieve G. The apron B, which passes around the two rollers $c$ $d$, is placed on a lower level than the one A, and is not so long. At the upper end of this apron is placed a second flipper, D, which is placed a little above the level of the top of the apron, and a second shoe, 2, which continues on down under the apron and forms the chute F. The end of the shoe is turned upward, so as to extend a little above the top of the apron, and catches all of the grain which has passed with the straw from the first apron A. When this shoe and flipper are not combined with the second apron, as here shown, all of the grain which is not caught as it passes from the first apron is lost; and, by their use, fully eight per cent. more of the grain is recovered than without them. L represents the feeding-table; K, the cylinder in which the beater is placed; I, the fan; J, the transverse grain-conveyer; and H, an opening in the side of the frame for the purpose of facilitating the clearing of the apron B of any obstructions.

Having thus described my invention, I claim—

In combination with the second apron B, the flipper D raised above its end, and the curved shoe 2, having its end extending up to, or above the level of, the apron, substantially as shown and described.

JAMES B. SUITT.

Witnesses:
   J. G. LIGHTFORD,
   WM. SULLIVAN.